United States Patent [19]

Hirai

[11] 4,134,126

[45] Jan. 9, 1979

[54] COLOR RECORDER HAVING MEANS FOR REDUCING LUMINANCE CROSSTALK IN DISPLAYED IMAGE

[75] Inventor: Jun Hirai, Yokohama, Japan

[73] Assignee: Sony Corporation, Tokyo, Japan

[21] Appl. No.: 815,014

[22] Filed: Jul. 12, 1977

[30] Foreign Application Priority Data

Aug. 20, 1976 [JP] Japan .................................. 51/99963

[51] Int. Cl.² .......................... H04N 5/78; H04N 5/79
[52] U.S. Cl. ........................................... 358/4; 358/8; 360/33; 360/37
[58] Field of Search ..................... 358/4, 8; 360/33, 37

Primary Examiner—John C. Martin
Attorney, Agent, or Firm—Lewis H. Eslinger; Alvin Sinderbrand

[57] ABSTRACT

A method of and apparatus for recording a video signal in successive parallel tracks on a record medium, and for reproducing the recorded signal. The video signal, which may be the luminance component of a composite color television signal, frequency modulates a carrier to produce a frequency modulated video signal. The phase of the frequency modulated video signal is selectively shifted in selected line intervals and is recorded in parallel tracks such that the phase difference between frequency modulated video signals in at least some adjacently recorded line intervals of successive tracks is an odd multiple of $\pi$. In one embodiment, the difference between the phase of alternate line intervals which are recorded in one track and the phase of alternate line intervals which are recorded in the next adjacent track is equal to an odd multiple of $\pi$. In accordance with another embodiment, the difference between the phases of successive line intervals which are recorded in the same track is equal to an odd multiple of $\pi$. The phase shift is attained by inserting a pulse signal into selected line intervals of the video signal in advance of the frequency modulation. During reproducing, the successive tracks are scanned and the frequency modulated signals recorded therein are reproduced together with a crosstalk component which is picked up by the transducer from an adjacent track, the crosstalk components being out of phase with each other. The reproduced frequency modulated signal is demodulated so as to recover the original video signal and the inserted pulse signal, the latter being eliminated from the recovered video signal.

53 Claims, 23 Drawing Figures

COLOR RECORDER HAVING MEANS FOR REDUCING LUMINANCE CROSSTALK IN DISPLAYED IMAGE

BACKGROUND OF THE INVENTION

This invention relates to a method of and apparatus for recording and/or reproducing video signals on a record medium and, more particularly, to a method and apparatus for recording video signals with a high recording density and for reproducing such signals with minimal interference in the displayed video picture due to crosstalk picked up from adjacent tracks when a particular track is reproduced.

In a typical video recording system, such as a video tape recorder (VTR), a video signal is recorded on a magnetic medium, such as magnetic tape, in successive, parallel, skewed tracks, each track generally having a field interval recorded therein and being formed of successive areas which correspond to respective line intervals of the video signal. If the video signal is a composite color television signal, recording is carried out by separating the chrominance and luminance components, frequency modulating the luminance component to a relatively higher band of frequencies, frequency converting the chrominance component to a band of frequencies which is lower than that contained in the frequency-modulated luminance signal, combining the frequency-modulated luminance signal and frequency-converted chrominance signal and recording the combined signal in the same track. In order to avoid interference due to crosstalk during a signal reproduction operation that is, to avoid interference due to signals which are picked up by a scanning transducer from an adjacent track when a given track is scanned, it has been the practice heretofore of providing guard bands to separate successive parallel tracks on the record medium. Such guard bands essentially are "empty" of information so as to avoid crosstalk pickup from such adjacent guard bands when a particular track is scanned.

However, the use of guard bands to separate successive tracks is a relatively inefficient usage of the record medium. That is, if the guard bands themselves could be provided with useful information, the overall recording density would be improved. Such improvement can be attained to some degree by providing two transducers for recording the combined luminance and chrominance signals, the two transducers having different azimuth angles. Hence, information is recorded in one track at one azimuth angle and information is recorded in the next adjacent track with a different azimuth angle. When the information in such tracks is reproduced by the same, respective transducers, the information recorded in the scanned track is reproduced with minimal attenuation, but because of azimuth loss, the crosstalk which is picked up from the next adjacent track is substantially attenuated. Since azimuth loss is proportional to the frequency of the recorded signals, it may be appreciated that the crosstalk due to the frequency-modulated luminance signals included in the recorded color television signals is far more attenuated than the crosstalk due to the frequency-converted chrominance signals. Also, since crosstalk attenuation due to azimuth loss is less effective as the width of the parallel tracks is reduced, it is not sufficient to rely solely on the use of transducers having different azimuth angles in order to reduce crosstalk noise when video signals are recorded in very narrow or overlapped tracks. If the crosstalk picked up from an adjacent track is not attenuated adequately, an interference or beat signal, having a frequency different from either the information signals which are recorded in the scanned track or the picked up signals which are recorded in an adjacent track, will appear as a beat or moire pattern in the video picture which ultimately is displayed.

Since reliance upon azimuth loss is not completely adequate for minimizing crosstalk interference caused by the frequency-converted chrominance signals which are picked up from an adjacent track, it has been proposed that such cross-talk can be reduced substantially by recording the frequency-converted chrominance signals in adjacent tracks with different carriers. For example, the phase of the frequency-converted chrominance carrier can be constant throughout successive line intervals in one track but will shift by 180° from line-to-line in the next adjacent track. As another example, the phase of the frequency-converted chrominance carrier in alternate line intervals in one track will differ by 180° (or $\pi$) from the phase of the frequency-converted chrominance carrier in adjacent alternate line intervals in an adjacent track, while all of the remaining line intervals in adjacent tracks will have frequency-converted chrominance carriers which are in phase with each other. Because of these phase characteristics in both examples, the crosstalk interference due to the frequency-converted chrominance signals which are picked up from an adjacent track will exhibit a frequency interleaved relationship with respect to the frequency-converted chrominance signals which are reproduced from the scanned track. Suitable filtering techniques can be used to eliminate those frequency components which correspond to the crosstalk interference.

While the use of different frequency-converted chrominance carriers is an effective technique for minimizing crosstalk interference attributed to the chrominance signals, there still will be crosstalk interference due to the frequency-modulated luminance signals, particularly if the record tracks exhibit minimal width. One proposed solution to this problem is disclosed and claimed in copending application Ser. No. 770,315, filed Feb. 18, 1977, wherein different carriers for the frequency-modulated luminance signal are recorded in adjacent tracks. This is carried out by using two different bias voltages superposed onto the luminance signal prior to frequency modulation thereof, which bias voltages effectively determine the frequency of a frequency-modulated carrier. As one example of this proposed solution, the frequencies of the carriers differ from each other by an odd multiple of one-half the horizontal synchronizing frequency. In a signal reproduction operation, the reproduced frequency-modulated luminance signal is demodulated, and the bias voltages which had been added to the original luminance signal are removed therefrom, as by subtracting locally-generated bias voltages from the recovered luminance signal. When the reproduced signals are displayed, as on a cathode ray tube, crosstalk interference will be present in successive lines, but such interference will be phase-inverted from line-to-line. Hence, this crosstalk interference will cancel visually and will not be perceived by a viewer.

Another proposed solution is described in application Ser. No. 815,012, filed on even date herewith, wherein the phase of the frequency modulated luminance signal is selectively shifted by an odd multiple of $\pi$ during selected line and field intervals. For example, the phase of the frequency modulated luminance signal may be shifted in successive line intervals which are recorded in alternate tracks, while such phase remains constant in the remaining tracks. As another example, the phase of the frequency modulated luminance signal varies by an odd multiple of $\pi$ between alternate line intervals in one track and adjacent alternate line intervals in the next adjacent track.

OBJECTS OF THE INVENTION

It is an object of the present invention to provide an improved phase shifting technique for carrying out the proposed solution disclosed in application Ser. No. 815,012.

Another object of this invention is to determine the phase shift of a frequency modulated video signal for a recording operation by selectively inserting a pulse of predetermined amplitude and phase into the video signal in advance of the frequency modulation thereof.

A further object of this invention is to provide a method of and apparatus for determining selective phase shifts of a frequency modulated video signal by selectively superimposing a pulse signal thereon, such as during the horizontal synchronizing interval, such that when the phase shifted frequency modulated video signal is recorded and then reproduced, crosstalk noise is not present in a video picture derived therefrom, and the reproduced superimposed pulse signal is readily cancelled for the video signal.

A further object of this invention is to provide an improved method of and apparatus for recording a composite color television signal in relatively narrow, successive parallel tracks on a record medium wherein crosstalk interference due to both luminance and chrominance components which are picked up during a signal reproducing operation is minimized.

Various other objects, advantages and features of this invention will become readily apparent from the ensuing detailed description, and the novel features will be particularly pointed out in the appended claims.

SUMMARY OF THE INVENTION

In accordance with the present invention, an information signal component, such as a video signal component, is recorded in successive parallel tracks on a record medium, the information signal component occurring in successive first time intervals, such as line intervals, which are included in repetitive second time intervals, such as field intervals, each track being formed of successive areas corresponding to the first time intervals. The information signal component is frequency modulated and selectively phase shifted so that the phase of the frequency-modulated information signal recorded in a predetermined area differs from the phase of the frequency-modulated information signal recorded in an adjacent area by an odd multiple of $\pi$. These adjacent areas are, in one embodiment, successive areas in a given track; and in another embodiment, are in adjacent tracks. The phase shifting of the frequency-modulated information signal is obtained by selectively inserting a pulse signal of predetermined amplitude and duration into selected first time intervals of the information signal component in advance of the frequency modulation thereof. In a signal reproducing operation, the recorded signals are reproduced such that the frequency-modulated information signal recorded in each track together with a cross-talk component picked up from an adjacent track are recovered, the crosstalk components being out of phase with each other. The frequency-modulated information signal is demodulated to recover the original information signal component and the previously inserted pulse signals, the latter then being eliminated from the recovered information signal component.

BRIEF DESCRIPTION OF THE DRAWINGS

The following detailed description, given by way of example, will best be understood in conjunction with the accompanying drawings in which:

FIGS. 6A-6D are waveform diagrams and graphical depictions which are useful in explaining the manner in which a pulse signal can be used to determine the phase shift of a frequency modulated video signal;

DETAILED DESCRIPTION OF CERTAIN PREFERRED EMBODIMENTS

Figure 1:
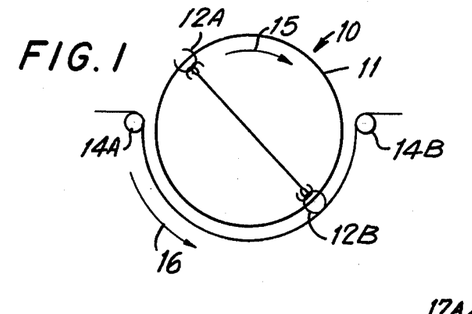
FIG. 1 is a schematic view of a typical rotary head assembly for a video signal recording apparatus.
Figure 3:
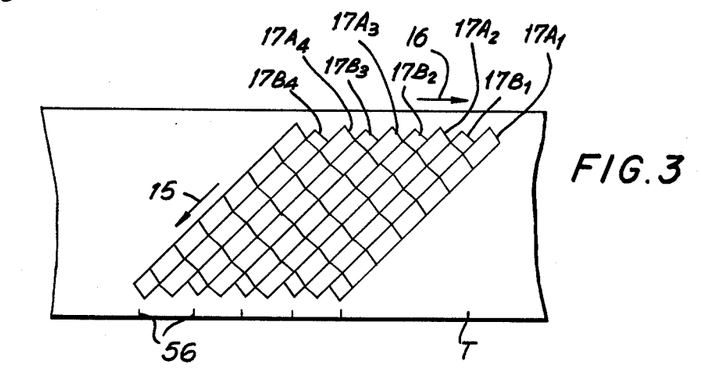
FIG. 3 is a schematic view of a portion of the record medium upon which the video signals are recorded in successive parallel tracks.

Referring now to the drawings, wherein like reference numerals are used throughout, and initially to FIG. 1, a rotary head assembly 10 is used to record video signals on and reproduce such signals from a magnetic tape T, the assembly including a guide drum 11 having a circumferential slot, and a pair of diametrically opposed rotary transducers or heads 12A and 12B mounted at opposite ends of a suitable support so as to move in a circular path along the circumferential slot of drum 11. The magnetic tape T is suitably guided, as by guide rollers 14A and 14B, in a helical path extending about a substantial portion of the periphery of drum 11. Thus, when the heads are rotated in the direction of the arrow 15 and, simultaneously, tape T is suitably driven in the longitudinal direction indicated by the arrow 16, heads 12A and 12B alternately scan successive parallel tracks 17 extending across tape T at an angle to the longitudinal direction of the tape (FIG. 3). As shown in FIG. 3, head 12A scans alternating tracks, for example, tracks $17A_1$, $17A_2$, $17A_3$, $17A_4$, . . . while head 12B scans the remaining alternating tracks $17B_1$, $17B_2$, $17B_3$, $17B_4$, . . . Thus, adjacent tracks, such as tracks $17A_1$ and $17B_1$, are respectively scanned by the heads 12A and 12B.

Usually, but not necessarily, each of tracks 17 has recorded therein the signal information corresponding to a respective field interval of the video signals, and each track is divided into successive areas or increments each having recorded therein the signal information corresponding to a line interval of the respective field of the video signals. Each line interval and each field interval of the video signals contains a blanking and synchronizing portion and, in accordance with accepted practice, the relative movements of head and tape in the directions 15 and 16 preferably are regulated in accordance with the synchronizing signals of the video signals to be recorded so as to obtain so-called H-alignment of the areas in which line intervals are recorded in each track in alignment with the areas in which line intervals are recorded in the next adjacent tracks. In other words, as shown schematically in FIG. 3, the ends of the margins between the areas in which the line intervals are recorded in each of tracks 17 preferably are aligned, in the direction transverse to the lengths of the tracks, with the adjacent ends of such margins in the next adjacent tracks. However, this H-alignment configuration is not absolutely necessary for recording or reproducing video information on tape T.

Figure 2:
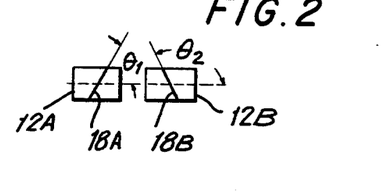
FIG. 2 is a schematic illustration of the different azimuth angles provided in the recording heads of the assembly shown in FIG. 1.

As shown in FIG. 2, heads 12A and 12B have air gaps 18A and 18B, respectively, arranged at substantially different azimuth angles $\theta_1$ and $\theta_2$ in respect to the plane of rotation of heads 12A and 12B. Because of these different azimuth angles, each of heads 12A and 12B, when recording video signals in the respective tracks on tape T, effects magnetization of magnetic domains in the magnetic coating on tape T in what would appear to be, if such domains were visible, a series of parallel lines or stripes extending across the respective track and each having an orientation that corresponds to the azimuth angle $\theta_1$ or $\theta_2$ of the gap of the respective head 12A or 12B. When reproducing video signals which have been recorded with these different azimuth angles, each of tracks $17A_1-17A_4$ is scanned by head 12A and each of tracks $17B_1-17B_4$ is scanned by head 12B, so that gap 18A extends at an angle with respect to the domains in tracks $17B_1-17B_4$ but is aligned with the domains in tracks $17A_1-17A_4$ and, similarly, gap 18B extends at an angle with respect to the domains in tracks $17A_1-17A_4$ but is aligned with the domains in tracks $17B_1-17B_4$. Hence, if one head, such as head 12A, while scanning one track, such as track $17A_1$, overlaps an adjacent track, such as track $17B_1$, to reproduce as crosstalk the signals recorded in such adjacent track, the well-known azimuth loss causes attenuation of the crosstalk signals picked up from such adjacent track.

Figure 4:
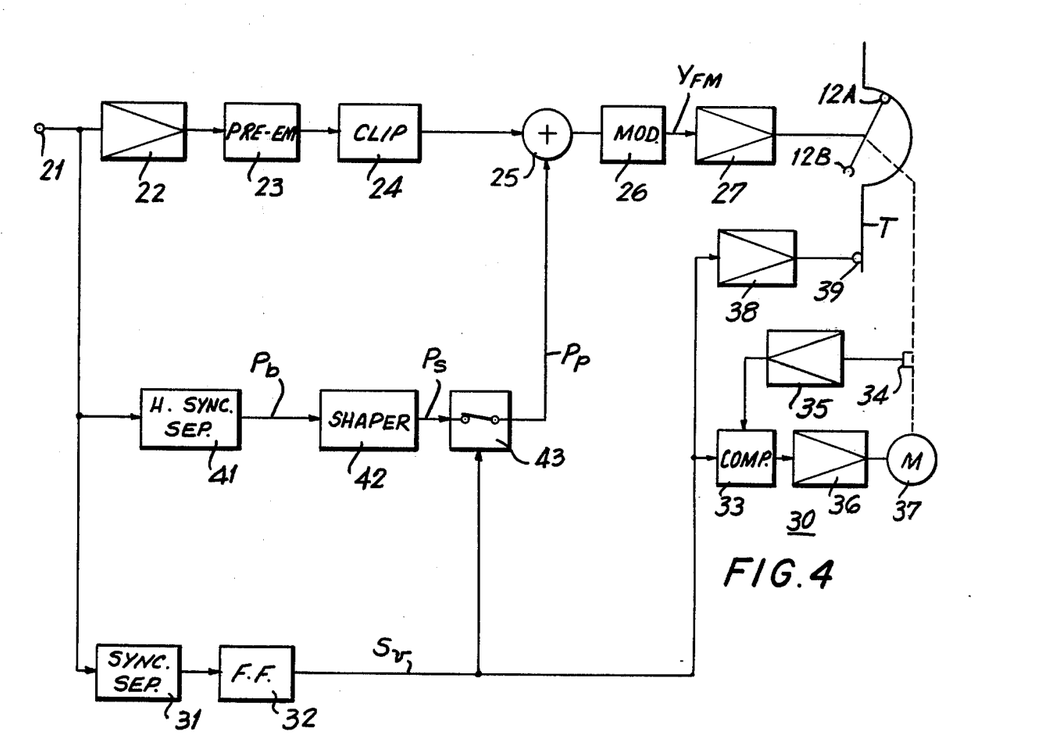
FIG. 4 is a block diagram representing one embodiment of the present invention by which a video signal component is recorded on the record medium shown in FIG. 3.

Turning now to FIG. 4, there is illustrated a block diagram of one embodiment of apparatus in accordance with the teachings of the present invention. For the purpose of simplification, the illustrated apparatus is directed to that portion of a color television signal recorder which is capable of recording the luminance component included in the color television signal. That is, the remainder of the recording circuitry which is used for recording the chrominance component is omitted from FIG. 4. As may be appreciated, if the video signal which is to be recorded comprises merely a monochrome (black-and-white) signal, then the apparatus illustrated in FIG. 4 is, essentially, complete for the recording of such a monochrome video signal.

The recording apparatus includes an input terminal 21 to which the luminance component of a composite color television signal or the monochrome video signal (both hereinafter being referred to as a video signal) is applied, this input terminal being coupled to a channel wherein the video signal is frequency modulated prior to recording on a record medium. The channel is comprised of an amplifier 22, which may be an automatic gain control amplifier, a pre-emphasis circuit 23 in which the high frequency response of the video signal is enhanced, a clipping circuit 24 wherein overshooting and undershooting portions of the enhanced video signal, as well as undesired amplitude modulations thereof, are eliminated or clipped, a frequency modulator 26 in which a carrier of relatively high frequency is frequency modulated by the enhanced, clipped video signal, and a recording amplifier 27. As shown, these circuits are connected in cascade. The output of recording amplifier 27 is coupled through suitable switching circuitry (not shown) to the rotary head assembly previously described with respect to FIG. 1 wherein heads 12A and 12B record successive tracks 17A and 17B across tape T.

As is conventional, the video signals applied to input terminal 21 also include synchronizing signals comprised of horizontal synchronizing signals and vertical synchronizing signals. The horizontal synchronizing signals separate successive line intervals of video information, and the vertical synchronizing signals define successive field intervals in which the line intervals are provided. A vertical synchronizing signal separator 31 is coupled to input terminal 21 and is adapted to separate the vertical synchronizing signals from the received video signal. Vertical synchronizing signal separator circuits are well known to those of ordinary skill in the art and need not be further described herein. A bistate device 32, such as a flip-flop circuit, is coupled to the output of the vertical synchronizing signal separator and is adapted to change its state, or condition, in response to each separated vertical synchronizing signal. As may be appreciated, the vertical synchronizing frequency of the separated vertical synchronizing signals is divided by flip-flop circuit 32, this flip-flop circuit producing an alternating signal whose half-cycle duration is equal to a field interval.

The output of flip-flop circuit 32 is coupled to a servo control circuit 30 which is adapted to control the operation of a drive motor 37 mechanically coupled to the rotary transducer assembly to insure that the respective heads 12A and 12B commence their scanning of a record track 17A and 17B at the beginning of a field interval. Servo control circuit 30 is comprised of a comparator 33 which is capable of comparing the phase of the alternating signal produced by flip-flop circuit 32 to the phase of heads 12A and 12B. The phase, or relative positions, of the heads is represented by a pulse signal generated by a pulse generator 34. In a typical embodiment, drive motor 37 is mechanically coupled to the rotary transducer assembly by a drive shaft, this shaft including an element, such as a magnet, aligned with one of heads 12A and 12B. A magnetic pick-up coil is positioned to sense the magnet and to generate an output pulse in response thereto; that is, to generate an output pulse when, for example, head 12A first comes into contact with tape T. The output of pulse generator 34 is coupled via a wave-shaping amplifier 35 to another input of comparator 33. An error signal proportional to the difference between the phase of the alternating signal produced by flip-flop circuit 32 and the phase of the pulse signals generated by pulse generator 34 is supplied as an adjusting signal to motor 37 via an amplifier 36.

Hence, it is seen that servo control circuit 30 functions to bring heads 12A and 12B into contact with tape T at the beginning of a field interval such that a complete field interval is recorded in a given track across the tape. In an alternative embodiment, if more than one field interval is to be recorded in a track, servo control circuit 30 would be substantially the same as shown in FIG. 4, and flip-flop circuit 32 would be replaced by an appropriate divider circuit, whereby the alternating signal produced by such a divider circuit would be formed of half-cycle intervals which are substantially equal to the duration of each track.

The output of flip-flop circuit 32 also is used as a control signal which is recorded along a longitudinal edge of tape T for a purpose soon to be described. To this effect, the output of flip-flop circuit 32 is coupled through an amplifier 38 to a fixed transducer or head 39, whereby control signals 56 (FIG. 3) are recorded in alignment with particular tracks.

As mentioned previously, if the tracks in which the video signals are recorded are free of guard bands, and if such tracks exhibit minimal width, a crosstalk component will be picked up during a signal reproducing operation when a particular track is scanned, the crosstalk component being attributed to the video signals recorded in an adjacent track. Furthermore, even if the tracks are recorded by use of transducers having different azimuth angles, such as by use of heads 12A and 12B, the normal attenutation of crosstalk components due to azimuth loss is not effective to minimize such crosstalk components. Hence, it is necessary to process the video signals in a manner whereby crosstalk interference will be substantially reduced during a signal reproducing operation, and particularly when the reproduced video signal is displayed on a cathode ray tube. This crosstalk reduction is attained by varying the phase of the frequency-modulated video signals recorded in one track relative to the phase of the frequency-modulated video signals recorded in an adjacent track. In one embodiment of this invention, and with reference to FIG. 3, the phase of the frequency-modulated video signal is changed by an odd multiple of $\pi$ in successive line intervals of, for example, track $17A_1$, but remains constant from one to the next line interval in adjacent track $17B_1$. This phase shift in successive line intervals is repeated in track $17A_2$, $17A_3$, ..; and the phase in successive line intervals of tracks $17B_2$, $17B_3$, ... remains constant. In another embodiment, the phase of the video signals recorded in alternate line intervals of, for example, trac $17A_1$ differs from the phase of the video signals recorded in alternate line intervals in adjacent track $17B_1$ for an odd multiple of $\pi$, such alternate line intervals in track $17A_1$ being adjacent the aforementioned alternate line intervals in track $17B_1$. A similar phase relation holds for the remaining tracks. A mathematical explanation as to how this selective phase shifting of the frequency-modulated video signals minimizes perceptible cross-talk interference in a video picture derived from a reproduction of such frequency-modulated video signals, is set out in detail in copending application Ser. No. 815,012.

The manner in which the phase of the recorded video signals is controlled in accordance with the foregoing embodiments is shown by the phase control circuitry of FIG. 4. This phase control circuitry is comprised of a horizontal synchronizing signal separator 41, a pulse forming or shaping circuit 42, a switching circuit 43 and an adding or combining circuit 25. Horizontal synchronizing signal separator 41 may be of conventional construction and is coupled to input terminal 21 so as to separate the horizontal synchronizing signal from the received video signal. The separated horizontal synchronizing signals produced by horizontal synchronizing signal separator 41 are supplied to pulse forming circuit 42 which is adapted to generate a pulse of predetermined amplitude and duration in response to each separated horizontal synchronizing pulse, as will be described below with respect to FIGS. 6C and 6D.

Switching circuit 43 is shown diagramatically as having a movable contact selectively switched to connect its input to its output. Switching circuit 43 may be comprised of transistor switching devices, a diode switching array, or the like. The input of the illustrated switching circuit is supplied with the pulse signals generated by pulse forming circuit 42. Switching circuit 43 is controlled so as to selectively couple the pulse signals applied thereto to its output. Appropriate control over the switching circuit is achieved by flip-flop circuit 32 which produces a signal that alternates between two levels and which is used to selectively energize, or close, switching circuit 43. When the switching circuit is closed, pulses produced by pulse forming circuit 42 are adapted to be added to the enhanced, clipped video signal in an adding circuit 25, the resultant signal being applied to frequency modulator 26.

Figure 5A:
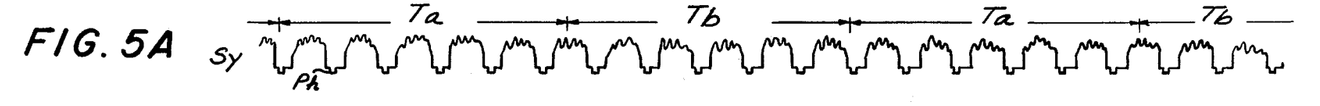
FIGS. 5A-FJ are waveform diagrams which are useful in explaining the operation of the apparatus shown in FIG. 4.
Figure 5B:
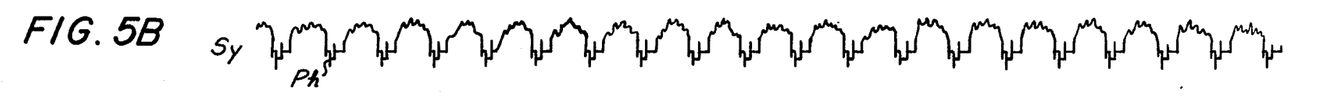

The operation of the apparatus illustrated in FIG. 4 will best be understood by referring first to the waveforms shown in FIGS. 5A–5J. Let it be assumed that the received video signal $S_y$ at input terminal 21 is as shown in FIG. 5A, constituted by successive line intervals of video information separated by horizontal synchronizing intervals each containing a horizontal synchronizing pulse $P_h$, the line intervals being included in successive field intervals $T_a$, $T_b$. Video signal $S_y$ is applied to pre-emphasis circuit 23, resulting in the waveform shown in FIG. 5B wherein the transitions of the horizontal synchronizing pulses $P_h$ are subjected to undershoots and overshoots.

Figure 5C:
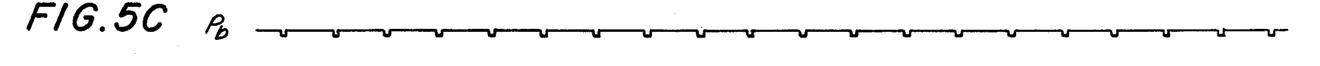
Figure 5D:
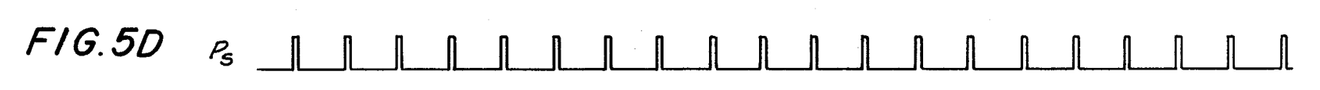

Video signal $S_y$ also is applied to horizontal synchronizing signal separator 41, from which separated horizontal synchronizing pulses $P_b$ (FIG. 5C) are transmitted to pulse forming circuit 42. The pulse forming circuit may include delay, inverting and amplifying circuits so as to produce pulse signals $P_s$ (FIG. 5D) from the received horizontal synchronizing pulses $P_b$. Pulse signals $P_s$ are of predetermined amplitude and predetermined duration, for a purpose soon to be explained. For the purpose of the present discussion, the pulse "amplitude" is intended to mean both magnitude and polarity of the pulse signal. Hence, in some embodiments, pulse signals $P_s$ may appear as negative pulses. In the illustrated waveforms, pulse signals $P_s$ are delayed, or timed, to coincide with the back porch of the horizontal synchronizing pulses. It will become apparent that pulse signals $P_s$ may coincide with any portion of the horizontal synchronizing interval, or with the line interval, as desired.

Figure 5E:
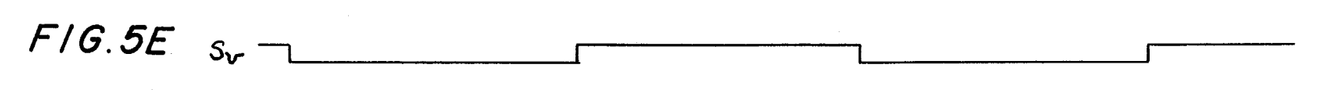
Figure 5F:
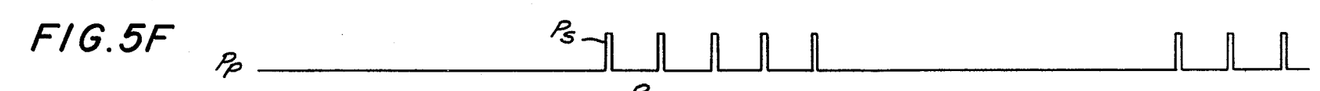

Video signal $S_y$ also is applied from input terminal 21 to vertical synchronizing signal separator 31 so as to derive the vertical synchronizing signals therefrom. These vertical synchronizing signals occur at the field rate between successive fields $T_a$, $T_b$, $T_a$, ... The separated vertical synchronizing signals are supplied to flip-flop circuit 32 so as to produce the alternating signal $S_v$ shown in FIG. 5E. This alternating signal preferably is a rectangular wave signal formed of successive half-cycles of field durations $T_a$, $T_b$, respectively. Signal $S_v$ is applied as a control signal to switching circuit 43, thereby selectively energizing the switching circuit during one or the other of its halfcycles. It will be assumed that switching circuit 43 is energized (i.e., closed) during the positive half-cycles of signal $S_v$.

Figure 5G:
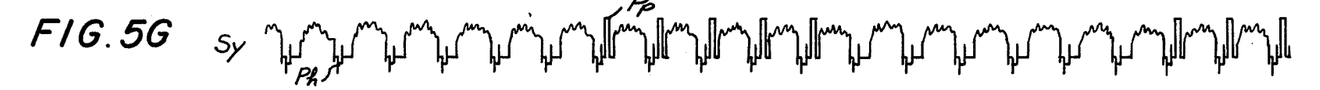

When switching circuit 43 is energized, the pulse signals $P_s$ applied thereto are transmitted to a-ding circuit 25 whereat they are added, or superimposed onto the video signal $S_y$, thereby forming the signal $S_y$ shown in FIG. 5G. Of course, when switching circuit 43 is de-energized, the transmission path between pulse forming circuit 42 and adding circuit 25 is interrupted. The resultant signal $S_y$ (FIG. 5G) having pulse signals $P_p$ selectively superimposed thereon is applied to frequency modulator 26 whereat it modulates a carrier. This frequency-modulated video signal then is recorded in successive, narrow tracks, as shown in FIG. 3. As will be discussed with reference to FIGS. 6A–6D, superimposed pulse signals $P_p$ are present in successive line intervals, then the phase of the frequency modulated video signal will shift successively, that is, from line-to-line. If the pulse signal $P_p$ is omitted from a line interval, the phase of the frequency modulated video signal will remain as during the preceding line interval. While various examples of phase shift are described below, let it be assumed that, as shown in FIG. 5G, the phase of the frequency-modulated video signal is shifted in successive line intervals during alternate field intervals, and that this phase shift is equal to an odd multiple of $\pi$, or 180°.

When the selectively shifted phase of the frequency-modulated video signal is recorded in successive tracks on tape T by heads 12A and 12B, the phase in successive line intervals in the track corresponding to field interval $T_a$ is constant throughout. However, the phase of the frequency-modulated video signal which is recorded in the next adjacent track corresponding to field interval $T_b$ varies by 180° in successive line intervals. That is, the phase in this track will appear as, for example, 0° in one line interval and will be shifted by 180° in the next line interval, and will be shifted by 180° in the following line interval, and so on. As is explained in copending application Ser. No. 815,012, when the frequency-modulated video signals are recorded in accordance with this phase relationship, crosstalk interference is effectively eliminated from the video picture which ultimately is reproduced. Insofar as elimination of this crosstalk component is concerned, the phase of the frequency-modulated video signal recorded in alternate line intervals during field interval $T_b$ differs from the phase of the frequency-modulated video signal recorded in alternate line intervals during field interval $T_a$ by 180°. That is, the phase of the first line interval in field interval $T_b$ differs from the phase of the first line interval in field interval $T_a$ by 180°. Also, the phase in the third line interval in field interval $T_b$ differs from the phase in the third line interval in field interval $T_a$ also by 180°. The remaining alternate line intervals in the respective field intervals exhibit this phase relationship. The remaining line intervals in field interval $T_b$ are in phase with the remaining line intervals in field interval $T_a$.

Control signals 56 recorded by transducer 39 along the longitudinal edge of tape T may be only the positive transitions in signal $S_v$ produced by flip-flop circuits 32, or only the negative transitions in this signal. Hence, these control signals serve to identify which tracks contain the aforedescribed phase-shifted frequency-modulated video signals. This identifying information is useful during a signal reproducing operation.

Signal $S_y$ also is applied as a control signal to servo control circuit 30. It is believed that one of ordinary skill in the art will fully understand how servo control circuit 50 operates; and in the interest of brevity, further description of this circuit is not provided.

When the frequency-modulated video signal, recorded with the phase relation described hereinabove, is reproduced, the primary signal which is recovered from the track being scanned is accompanied by a crosstalk signal picked up from an adjacent track. The frequency of this crosstalk signal is an odd multiple of one-half the horizontal synchronizing frequency $f_H$. That is, the crosstalk signals picked up during the scanning of successive tracks have the frequency $(m + \frac{1}{2})f_H$, with this crosstalk signal being phase-inverted in successive horizontal line intervals. Consequently, if an interfering crosstalk signal is reproduced in one line interval and is inverted in phase during the following line interval, this phase relationship in the interfering signals results in visual cancellation of the crosstalk signals when a corresponding video picture is reproduced on a cathode ray tube.

The manner in which pulse signals $P_p$ (FIG. 5G) determine the phase shift of the frequency modulated video signal now will be described, with reference to FIGS. 6A–6D. Let it first be assumed that a signal of constant level is applied to frequency modulator 26. Since this signal level does not charge, the output frequency f of the modulator remains constant. As is known, frequency can be expressed as a rate of change of phase, so that $f = d\theta/dt$ where $\theta$ represents the phase of the frequency modulated signal. With the assumption that the frequency t is constant, the rate of change of phase $\theta$ is constant, and can be represented as a straight line of, for example, positive slope. However, if a signal level is applied to frequency modulator 26 so as to change the output frequency of the modulator, this frequency change can be represented as a corresponding change in the rate of phase change. That is, $d\theta/dt$ will exhibit a change due to this applied signal level and will not be coincident with its afore-mentioned constant slope.

Figure 6A:
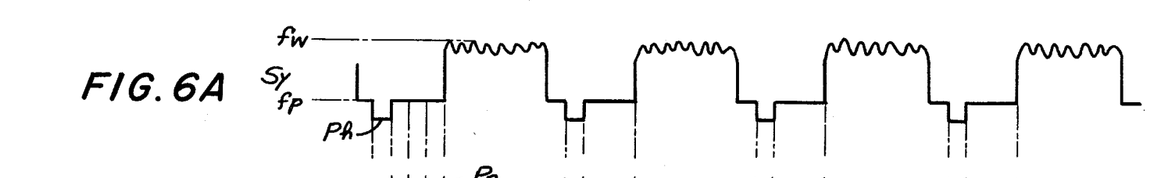

Turning now to FIG. 6A, the illustrated waveform represents a video signal $S_y$ wherein the horizontal synchronizing interval is greatly exaggerated. When the illustrated video signal is applied to frequency modulator 26, the modulated frequency will have a range from that corresponding to the white level $(f_w)$ to that corresponding to the sync tip, or synchronizing pulse $P_h$. As is shown, when the back porch (at the pedestal level) is applied to the modulator, the corresponding output frequency is $f_p$. Since the back porch is at a constant level, frequency $f_p$ is constant, and the change in phase $d\theta/dt$ occurs at a constant rate. This is represented by the solid line shown in FIG. 6C, and designated $\theta_o$.

The modulated frequency output from frequency modulator 26 varies as a function of the video information signal and also as a function of the synchronizing pulse $P_h$. Therefore, the phase change $d\theta/dt$ will not coincide with curve $\theta_o$ (FIG. 6C) during most of the horizontal line interval, but will exhibit a more complex waveform. This is represented by the broken line shown in FIG. 6C. Hence, when the video signal shown in FIG. 6A is applied to frequency modulator 26, the phase of the frequency modulated signal will be represented by the lower curve in FIG. 6C, and will change at a generally constant rate from line-to-line.

Let it now be assumed that pulse signals $P_p$ are inserted onto the back porch of video signal $S_y$, the duration of these pulse signals being equal to $\Delta t$. Frequency modulator 26 is responsive to this pulse signal to produce an abrupt change in the modulating frequency. Consequently the rate of change of the phase of the frequency modulated signal $d\theta/dt$ also changes abruptly. This is represented by the change $\Delta \theta$ in FIG. 6C. As may be appreciated, pulse signal $P_p$ is both preceded and followed by the pedestal level. Accordingly, the frequency $f_p$ corresponding to the pedestal level is constant, and the phase changes at a constant rate $d\theta/dt$. FIG. 6C represents the constant slope in the phase $\theta$ during the beginning portion of the back porch, followed by the abrupt change $\Delta \theta$ due to the pulse $P_p$, and then followed by the same constant slope for the remainder of the back porch, shown as curve $\theta_b$. Therefore, the phase of the frequency modulated video signal is changed from one line interval to the next by $\Delta \theta$ when a pulse signal $P_p$ is inserted into that line interval. A comparison between the substantially constant phase of the frequency-modulated video signal in the absence of pulse signals (FIG. 6A) and the phase-shifted frequency modulated video signal due to such pulse signals (FIG. 6B) is shown by curves $\theta_a$ and $\theta_b$ in FIG. 6C.

Figure 6B:
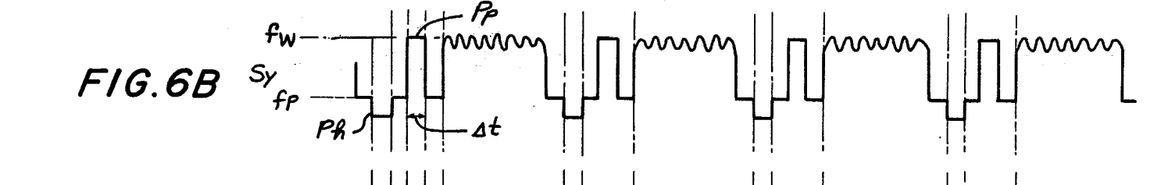
Figure 6C:
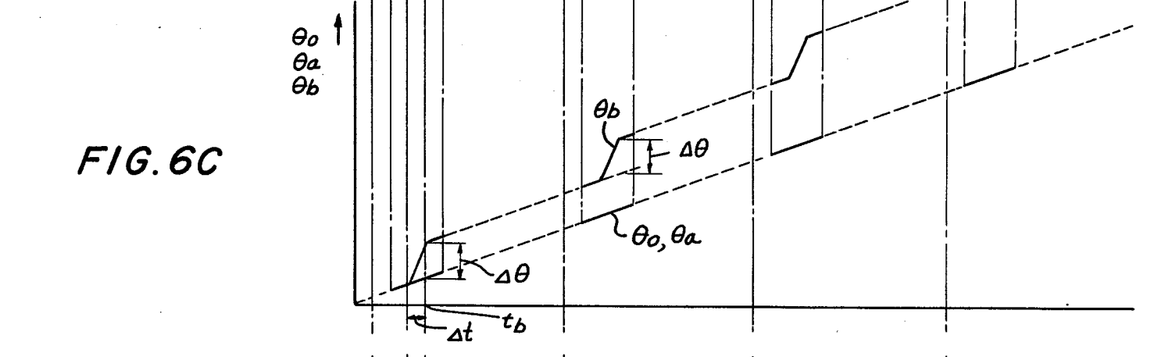
Figure 6D:
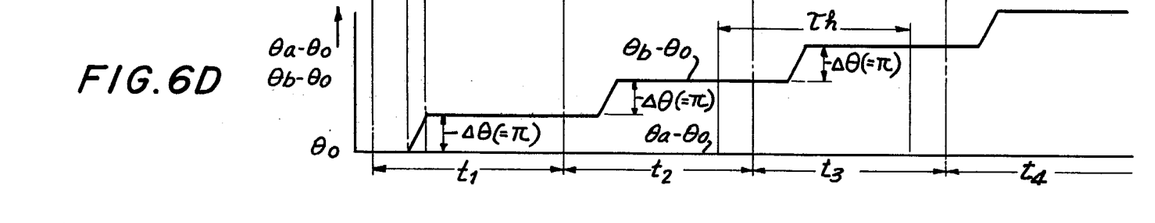

If the axis of FIG. 6C is rotated so as to coincide with the constant phase curve $\theta_o$, the result would appear as in FIG. 6D. As shown therein, the phase of the frequency modulated video signal increases due to the pulse signal $P_p$ by an amount $\Delta \theta$, but then remains constant for the remainder of the line interval, and until the next pulse signal $P_p$ is received to cause a further phase change $\Delta \theta$. In FIG. 6D, it is assumed that each pulse signal $P_p$ has an amplitude sufficient to cause a change in phase $\Delta \theta = \pi$, and that the pulse signals are inserted into the horizontal synchronizing interval in successive lines ($t_1, t_2, \ldots$) of alternate fields ($T_b$ only). Other examples of phase changes $\Delta \theta$ in selected line intervals are discussed below.

As a numerical example of the amplitude and duration of pulse signal $P_p$, let it be assumed that the pulse signal extends from the pedestal level to the white level (FIG. 6B). The frequencies produced by frequency modulator 26 corresponding to these levels are $f_p$ and $f_w$, respectively, which may be, for example, 4.04MHz and 4.4MHz, respectively. The change in angular frequency ($W_w - W_p$) during the time interval $\Delta t$ is to produce a phase shift of $\pi$. Accordingly, $(2\pi f_w - 2\pi f_p)\Delta t = \pi$. A reasonable approximation for the duration of pulse signal $P_p$ is one microsecond.

Figure 7:
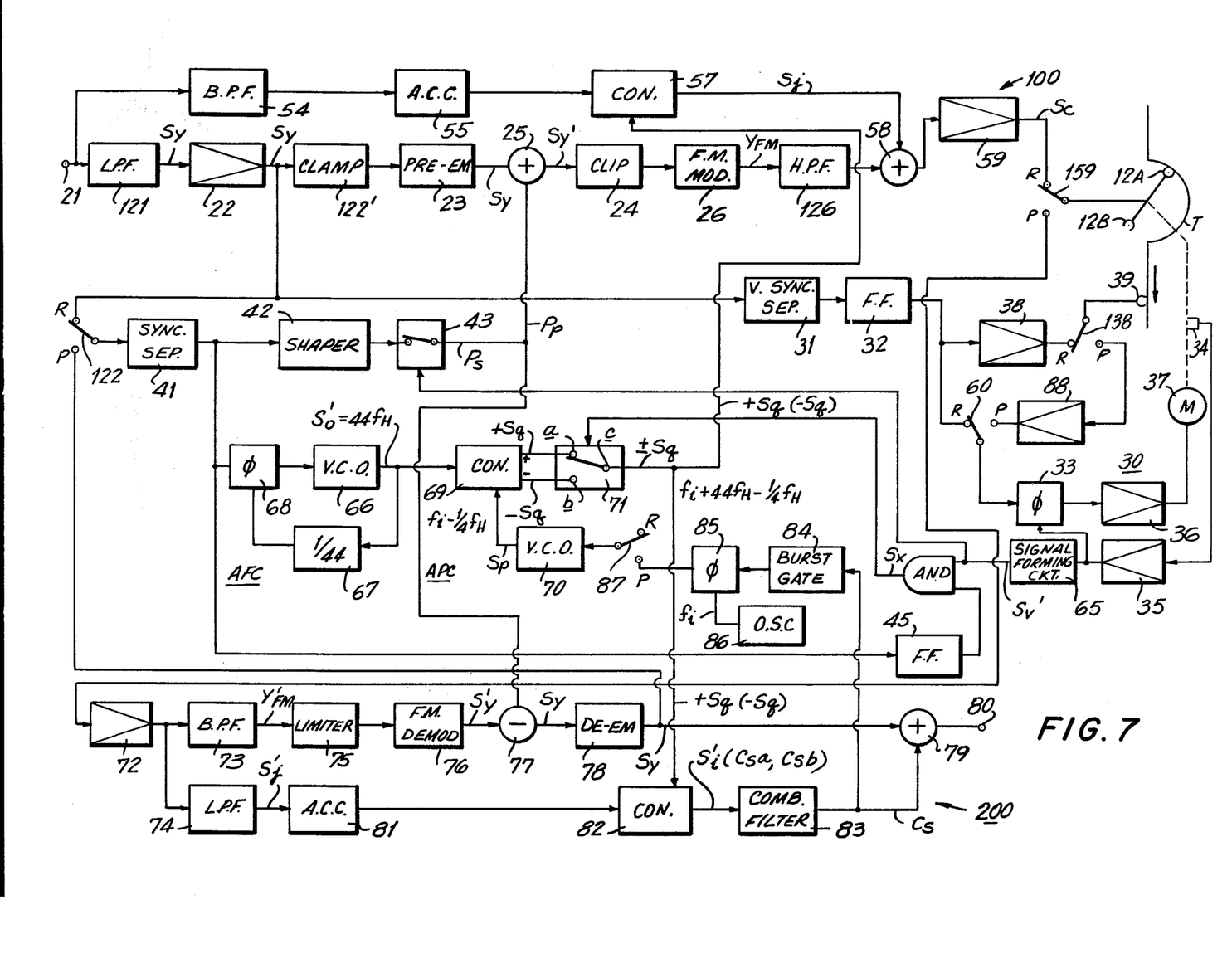
FIG. 7 is a block diagram of recording and reproducing apparatus incorporating the present invention.

The apparatus shown in FIG. 4 is adapted to be incorporated into apparatus for recording and/or reproducing a composite color television signal onto tape T. One embodiment of such apparatus is illustrated in FIG. 7 which includes a recording section 100 and a reproducing section 200. The recording section is provided with an input terminal 21 for receiving composite color television signals which include luminance and chrominance components and are composed of line, field and frame intervals with blanking and synchronizing portions in each of those intervals. The composite color signals are applied from input terminal 21 to a low pass filter 121 which transmits substantially only the luminance signal $S_y$ to automatic gain control amplifier 22, the latter applying an amplified luminance component to a clamp circuit 122 for clamping the luminance component to a fixed reference level, as is typical in such recording apparatus. The clamped luminance component is applied to pre-emphasis circuit 23 and then to adding circuit 25, as described previously with respect to FIG. 4. The output $S'_y$ of adding circuit 25 is supplied through clipping circuit 24 to frequency modulator 26 wherein it modulates an FM carrier. A comparison of FIGS. 4 and 7 indicates that clipping circuit 24 may be provided either before or after adding circuit 25. The frequency modulated luminance component $Y_{FM}$ from modulator 38 is passed through a high pass filter 126 to a mixing or adding circuit 58.

In accordance with this invention, and as previously described with reference to FIG. 4, the frequency modulated luminance component $Y_{FM}$ is selectively phase-shifted by an odd multiple of $\pi$ between adjacent line intervals. As will be recalled, this is achieved by inserting a pulse signal into selected line intervals of the frequency-modulated luminance component, the pulse signal being derived by pulse forming circuit 42 from a horizontal synchronizing pulse separated from the received luminance component by horizontal synchronizing signal separator 41, and being selectively inserted by the combination of switching circuit 43 and adding circuit 25.

In the FIG. 7 embodiment, switching circuit 43 is controlled by control signals $S_v'$, which are similar to signals $S_v$ of FIG. 4 (shown in FIG. 5E) to selectively energize switch 43, thereby selectively applying pulse signals $P_p$ to adding circuit 25.

The composite color television signals applied to input terminal 21 also are coupled to a band pass filter 54 which separates the chrominance component $S_i$ from the composite color signals and passes the chrominance component through an automatic color control circuit 55 to a frequency converter 57 in which the chrominance component and its carrier is converted from an original frequency $f_i$ to a frequency band lower than that of the frequency modulated luminance component $Y_{FM}$ supplied to mixing circuit 58. The frequency converted chrominance component $S_j$ also is supplied to mixing circuit 58 whereat it is combined with the frequency modulated luminance component $Y_{FM}$ for providing a composite signal $S_c$ which is supplied through a recording amplifier 59 and a record terminal R of a record/playback switch 159 to the rotary heads 12A and 12B.

The luminance component $S_y$ from automatic gain control circuit 22 also is supplied to vertical synchronizing signal separator 31, as in the FIG. 4 embodiment. The separated vertical synchronizing signals $P_v$ are applied from separator 31 to flip-flop divider 32 which is operative to provide control signals at a repetition rate which is a predetermined fraction ($\frac{1}{2} \times n$) of the repetition rate of the separated vertical synchronizing signals, in which n is the number of field intervals to be recorded in each of the tracks and is equal to one in the illustrated embodiment. The control signals produced by flip-flop circuit 32 occur in correspondence with the recording of color video signals in alternating, or every other one of the tracks so as to identify or distinguish between the tracks in which the chrominance component is recorded with first and second carriers, as hereinafter described in detail. Accordingly, the control signals are applied through an amplifier 38 and a record terminal R of a record/playback switch 138 to fixed transducer 39, as in the FIG. 4 embodiment.

The control signals from flip-flop circuit 32 also are supplied to servo control circuit 30 via the record terminal R of a record/playback switch 60. This servo control circuit has been discussed with respect to the embodiment of FIG. 4 and is seen to provide a brake control or servo signal which is passed through a servo amplifier 36 for either suitably decreasing or increasing the speed at which heads 12A and 12B are driven by motor 37, to that heads 12A and 12B will commence to move along respective tracks on tape T at the commencement of alternating field intervals of the color video signals being recorded.

Figure 5H:
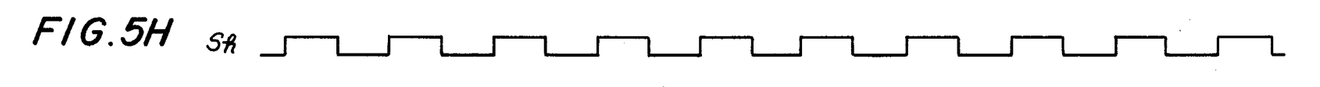

The separated horizontal synchronizing signals $P_h$ are applied from separator 41 to flip-flop circuit 45 which produces control signal $S_h$ (FIG. 5H) for application to one input of an AND gate 64. The output of wave forming circuit 35 is also applied to a signal forming circuit 65 which produces the previously mentioned control $S'_v$ applied to a second input of AND gate 64. Control signal $S_h$ is a rectangular wave having high and low intervals, each equal to one line interval H, and control signal $S'_v$ is a rectangular wave having high and low intervals, each equal to one field interval T, so that control AND gate 64 produces a control signal $S_x$ which remains low during one entire field interval and goes high only during alternate line intervals of the alternate field interval.

In the embodiment shown in FIG. 7, control signal $S_x$ controls the establishment of different carriers for the frequency converted chrominance component $S_j$ to be recorded in tracks that are next adjacent to each other, with such carriers differing from each other in their phase characteristics.

The apparatus for providing different carriers with which to frequency convert the chrominance component included in the composite color signal includes a voltage controlled oscillator 66 for providing an output oscillation with a center frequency of, for example, $44f_H$. The output of oscillator 66 is applied to a frequency divider 67 to be frequency-divided by a factor of 44, and the output of divider 67 is applied to a comparator 68 wherein the frequency of the output oscillation is compared to the frequency of the separated horizontal synchronizing signals $P_h$ which are supplied from separator 41. Upon any frequency deviation between the signals applied to comparator 68, a suitable control voltage is supplied thereby to voltage controlled oscillator 66 so that the frequency of the oscillation output is automatically controlled or maintained at $44f_H$.

The oscillation output from oscillator 66 is applied to a frequency converter 69, which may be in the form of a balanced modulator, to frequency convert the oscillation output by a frequency converting signal $S_p$ produced by a voltage controlled oscillator 70 having a center frequency of $f_i-\frac{1}{4}f_H$, in which $f_i$ is the original or standard carrier frequency of the chrominance component $S_i$ of the received color video signals. Balanced modulator 69 has two outputs (+ and −) of opposite polarity for providing frequency converting signals $+S_q$ and $-S_q$, respectively. Such frequency converting signals $+S_q$ and $-S_q$ are of opposite phase or polarity, but each has the frequency $(f_i+44f_H-\frac{1}{4}f_H)$.

The frequency converting signals $+S_q$ and $-S_q$ are applied selectively to frequency converter 57 through a switching circuit 71, shown schematically as having fixed contacts a and b respectively connected to the + and − outputs of balanced modulator 69 and a movable contact c which is switchable between contacts a and b and is connected to frequency converter 57. Switching circuit 71 is controlled by control signal $S_x$ produced by AND gate 64 so that the switching circuit applies frequency converting signal $+S_q$ to converter 57 whenever control signal $S_x$ has a low value, and the switching circuit applies frequency converting signal $-S_q$ to the converter whenever control signal $S_x$ has a high value. By alternately applying frequency converting signals $+S_q$ and $-S_q$ to frequency converter 57, the carrier of the chrominance component is converted from its original carrier frequency $f_i$ to a relatively lower carrier frequency $f_c=44f_H-\frac{1}{4}f_H$, the converter carrier frequency $f_c$ being below the frequency band of the frequency modulated luminance component $Y_{FM}$, and the phase or polarity of the frequency converted chrominance component $S_j$ is alternately reversed in response to the alternately applied frequency converting signals.

The converted carrier frequency $f_c$ of the frequency converted chrominance component $S_j$ satisfies the equation $$f_c = \tfrac{1}{4}f_H(2m-1)$$

in which m is a positive integer. Of course, in the present case, in which $f_c=44f_H-\frac{1}{4}f_H$, the value for m is 88. As a result of this converted carrier frequency $f_c$, the second harmonic of the converted carrier is interleaved with the luminance component so as to avoid beat interference therebetween. By avoiding such beat interference, the frequency converted chrominance component can be recorded with a relatively high amplitude in respect to the amplitude of the frequency modulated luminance component, thereby obtaining a good signal-to-noise ratio of the chrominance component.

When the frequency converted chrominance component $S_j$ and the frequency modulated luminance component $Y_{FM}$ are combined in mixing circuit 40, the frequency converted chrominance component $S_j$ amplitude modulates the frequency modulated luminance component $Y_{FM}$ to supply a composite signal $S_c$ through amplifier 59 and record/playback switch 159 to heads 12A and 12B for recording in the successive parallel tracks on tape T.

Switches 60, 87, 122, 138 and 159 are ganged, or interconnected, for simultaneous change-over from their recording positions, shown in FIG. 7, to their reproducing or playback positions in which the movable contact of each switch engages its playback terminal or contact P. In the reproducing section 200, a reproducing amplifier 72 is coupled to heads 12A and 12B via the playback terminal P of switch 159 for receiving the signals alternately reproduced by the heads from the successive parallel tracks on tape P. The output of reproducing amplifier 72 is connected in common to a band pass filter 73 and a low pass filter 74 which respectively separate the reproduced frequency modulated luminance component $Y_{FM}$ and frequency converted chrominance component $S'_j$. The frequency modulated luminance component $Y'_{FM}$, separated from the reproduced signals, is passed through a limiter 75 to a frequency demodulator 76 so as to obtain a demodulated luminance component $S'_Y$. It will be noted that the demodulated luminance component $S'_Y$ obtained from demodulator 76 will have the pulse signals $P_p$ selectively superimposed thereon, corresponding to the pulse signals which had been superimposed onto the luminance component $S_Y$ in adding circuit 25 in recording section 100. In order to eliminate the recovered pulse signals $P_p$ from the demodulated luminance component $S'_Y$, the demodulated component is applied to a subtracting circuit 77 which is also connected to the output of switching circuit 43 so as to supply pulse signals $P_p$ to the subtracting circuit during signal reproduction. As will be explained below, the pulse signals $P_p$ produced by switching circuit 43 during a reproducing operation are substantially equal to the pulse signals that had been reproduced thereby during a recording operation. Hence, this pulse signal $P_p$ is removed from the luminance component $S_Y'$ to result in luminance component $S_Y$ which is applied through a de-emphasis circuit 78 to a mixing or adding circuit 79 having its output connected to an output terminal 80.

The frequency converted chrominance component $S'_j$, separated from the reproduced signals by filter 74, is applied through an automatic color control circuit 81 to a frequency reconverter 82 which alternately receives the frequency converting signals $+S_q$ and $-S_q$ from switching circuit 71, and by which the carrier of the reproduced chrominance component $S'_j$ is reconverted to the original carrier frequency $f_i$. The resulting frequency reconverted chrominance component $S'_i$ is passed through a comb filter 83 in which, as hereinafter described in detail, chrominance components of cross-talk signals are cancelled or suppressed so that only the chrominance component $C_s$ of the video signals being reproduced from a particular track is passed to mixing circuit 79 whereat it is combined with the luminance component $S_Y$ from de-emphasis circuit 78. Hence, the desired reproduced video signals are applied by mixing circuit 79 to output terminal 80.

The chrominance component $C_S$ from comb filter 83 also is applied to a burst gate 84 adapted to extract burst signals from the reconverted chrominance signal component. The extracted burst signals are applied to one input of a phase comparator 85, and an oscillator 86 applies an output at the standard or original chrominance carrier frequency $f_i$ to a second input of the phase comparator. The output of phase comparator 85 is connected through playback terminal P of switch 87 to voltage controlled oscillator 70. It will be apparent that, in the reproducing mode of operation, any phase difference between the burst signals extracted by gate 84 from the reconverted chrominance component and the output of oscillator 86 causes comparator 85 to apply a suitable control voltage to voltage controlled oscillator 70 for effecting a required change in the phase of the converting signals $+S_q$ and $-S_q$ whereby to achieve an automatic phase control function for eliminating so-called jitter from a picture or image produced on a cathode ray tube in response to video signals obtained at output terminal 80.

In the reproducing mode of operation, control signal $S_x$ for operating switching circuit 71 again is obtained from AND gate 64 in response to control signals $S_v'$ and $S_h$ from signal forming circuit 65 and flip-flop 45, respectively. As before, the signal forming circuit 65 responds to the output of wave forming circuit 35 which, in turn, is responsive to the pulse signals from pulse generating means 34. However, in the reproducing mode, fixed head 39 reproduces the recorded control signals 56 which are applied through playback terminal P of switch 138 and through an amplifier 88 to comparator 33 via playback terminal P of switch 60. Thus, comparator 33 compares the phase of the reproduced control signals 56 with the output of wave forming circuit 35 so as to provide a suitable servo control signal which is applied through servo amplifier 36 for controlling the rotation of heads 12A and 12B by motor 37. Hence, the servo control arrangement is effective, in the reproducing mode, to ensure that each of the tracks on tape T will be scanned by the same head 12A or 12B which was employed for recording video signals in such track, and further to ensure that the control signal $S'_v$ applied to AND gate 64 will have the same relationship to the reproduced video signals as it had to the recorded video signals. In other words, if control signal $S'_v$ has its low and high values during the recording of video signals by heads 12A and 12B, respectively, control signal $S'_v$ will similarly have its low and high values during the reproducing of the signals by heads 12A and 12B, respectively. Further, the output of de-emphasis circuit 78 is connected through the playback terminal of switch 122 to horizontal sync separator 41, whereby the separator separates horizontal synchronizing signals from the reproduced luminance component $S_Y$ in order to control pulse forming circuit 42 and flip-flop circuit 45 in the reproducing mode similar to the control obtained in the recording mode.

Figure 5I:
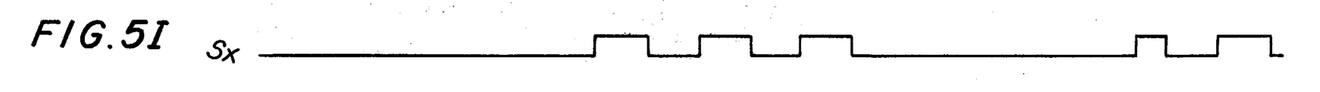
Figure 5J:
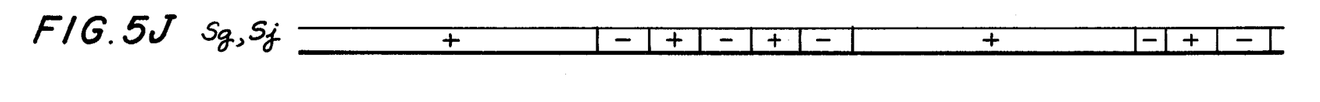

During recording, the operation of switching circuit 43 is as described above with respect to FIG. 4. The chrominance component $S_i$, having an original carrier frequency $f_i$, is separated from the received color video signals and is frequency converted in frequency converter 57 by the frequency converting signal $+S_q$ or $-S_q$ so as to provide the frequency converted chrominance component $S_j$ with the reduced carrier frequency $f_c = 44f_H - \frac{1}{4}f_H$. Thus, the frequency band of the frequency converted chrominance component $S_j$ is lower than that of the frequency modulated luminance component $Y_{FM}$ with which it is combined in mixing circuit 58 to form the composite or combined signal $S_c$ which is recorded by heads 12A and 12B in successive tracks on tape T. Switching circuit 71, which is controlled by the control signal $S_x$ (FIG. 5I) from AND gate 64, selectively determines which frequency converting signal $+S_q$ or $-S_q$ is applied to frequency converter 57. Since frequency converting signals $+S_q$ and $-S_q$ are of opposite phase or polarity, the resulting frequency converted chrominance component $S_j$ is provided with respective carriers $C_a$ and $-C_a$ which are similarly of opposed phase or polarity. It is appreciated that control signal $S_x$ remains low during one entire field interval recorded by, for example, head 12A, and goes high only during alternate line intervals of the next field interval, for example, the field interval recorded by head 12B. Thus, during each field interval recorded by head 12A, frequency converting signal $+S_q$ is continuously applied to frequency converter 57 with the result that the successive line intervals of each field interval recorded by head 12A are provided with a carrier of the same polarity. During successive line intervals of each field interval recorded by head 12B, frequency converting signals $+A_q$ and $-S_q$ are alternately applied to frequency converter 57 so that the successive line intervals of each field interval recorded by head 12B are alternately recorded with the carriers $C_a$ and $-C_a$ of opposed polarity. As one example of the foregoing, head 12A will scan tape T during intervals $T_a$ and head 123 will scan tape T during intervals $T_b$, as represented in FIG. 5J.

During reprodution, the rotation of heads 12A and 12B is servo-controlled by comparing the control signals 56 reproduced from tape T by fixed head 39 with the pulses from pulse generating means 34, so that those signals which had been recorded in respective tracks by heads 12A and 12B will be reproduced by the same heads. Because of this servo control of the rotation of heads 12A and 12B, the control signals S'$_v$ from signal forming circuit 65, and thus the control signal S$_x$ from AND gate 64, have the same relationships to the operative positioning of the heads 12A and 12B during the reproducing operation as during the recording operation. Thus, switching circuits 43 and 71 are controlled in the same manner during both recording and reproduction.

The frequency modulated luminance component Y'$_{FM}$ separated from the reproduced signals is demodulated in frequency demodulator 76 so as to obtain the demodulated luminance component S'$_Y$ which, as previously noted, will have selected pulse signals P$_p$ superimposed thereon. Since switching circuit 43 is controlled in synchronism with the recorded frequency modulated luminance signal (because of synchronized control signal S'$_v$), the selective transmission of a pulse signal from pulse forming circuit 42 through switching circuit 43 corresponds to the selective phase shifting of the reproduced frequency modulated luminance component, and thus coincides with the pulse signal P$_p$ which is inserted into the recovered luminance component S$_Y$'. By subtracting this generated pulse signal from the luminance component S$_Y$' in subtracting circuit 77, the recovered luminance component S$_Y$ is substantially equal to the original luminance component.

During reproduction, crosstalk interference in the reproduced luminance component is eliminated partly because of the different azimuth angles of heads 12A and 12B, and also by reason of the fact that the frequency modulated luminance component is recorded with different phases in adjacent tracks, as described above. Thus, in the event that each of the tracks on tape T has a small width so as to increase the recording density, in which case the azimuth loss is not sufficient to prevent crosstalk in respect to the frequency modulated luminance component, the reproducing head 12A, for example, when scanning track 17A$_2$, for example, when scanning track 17A$_2$, will pick up the signals recorded in that track and also, to some extent, the signals recorded in the next adjacent track 17B$_1$. However, the crosstalk component in each line interval reproduced by head 12A from track 17B$_1$ will differ in phase from the crosstalk component in the next adjacent line interval by an odd multiple of $\pi$. Similarly, the crosstalk component in each line interval reproduced by head 12B from track 17A$_2$ when this head scans track 17B$_2$ will differ in phase from the crosstalk component in the next adjacent line interval by an odd multiple of $\pi$. Accordingly, the interfering or noise signal due to crosstalk will be inverted in phase in successive horizontal line intervals of the video signals. Thus, when the reproduced video signals obtained at output terminal 80 are applied to a cathode ray tube, the interfering or noise signal due to luminance component crosstalk will visually cancel itself on the screen of the cathode ray tube, and will not appear as a conspicuous noise or beat in the displayed image.

Considering the frequency converted chrominance component, the effect of providing this component with carriers C$_a$, $-$C$_a$ of reversed phase or polarity in successive line intervals or areas of each track recorded by head 12B results in a new carrier C$_b$ having frequency components offset by $\frac{1}{2}f_H$ with respect to the frequency components of the carrier C$_a$ with which the frequency converted chrominance component is recorded in the next adjacent tracks by head 12A so as to interleave therewith. Accordingly, when, for example, head 12A wcans track 17A$_2$ on tape T for reproducing the frequency converted chrominance component recorded therein with the carrier C$_a$, the undesired or crosstalk signal simultaneously reproduced by head 12A from the next adjacent track 17B$_1$ has its frequency converted chrominance component provided with a carrier (C$_b$) in frequency interleaving relation to the carrier C$_a$. Similarly, when, for example, head 12B scans tracks 17B$_1$ for reproducing the frequency converted chrominance component recorded therein with the carrier C$_b$, the undesired or crosstalk signal simultaneously reproduced by head 12B from the next adjacent track 17A$_2$ has its frequency converted chrominance component provided with a carrier (C$_a$) in frequency interleaving relation to the carrier C$_b$.

Since switching circuit 71 is controlled by control signal S$_x$ in the same manner during both recording and reproduction, frequency reconverter 82 in the reproducing section 200 continuously receives the frequency converting signal +S$_q$ during the scanning of a track by head 12A, and frequency converting signals +S$_q$ and $-$S$_q$ are alternately applied to frequency reconverter 82 for successive line intervals during the scanning of a track by head 12B, as represented in FIG. 5J. Hence, during the scanning of a track by head 12A, frequency reconverter 82 reconverts the carriers C$_a$ of the chrominance component then being reproduced to a carrier C$_{sa}$ having the original carrier frequency f$_i$, while the carrier C$_b$ of the crosstalk chrominance component has its frequency similarly converted so as to be spaced midway between the principal side bands of the desired carrier C$_{sa}$. Similarly, during the scanning of a track by head 12B, frequency reconverter 82 frequency reconverts the carrier C$_b$ of the chrominance component then being reproduced to a carrier C$_{sb}$ also having the original frequency f$_i$, while the carrier C$_a$ of the crosstalk chrominance component has its frequency converted so as to be spaced midway between the principal side bands of the desired carrier C$_{sb}$. Thus, the reconverted carriers C$_{sa}$ and C$_{sb}$ of the chrominance component reproduced during alternate field intervals both have the same carrier frequency f$_i$, while the chrominance component of the undesired or crosstalk signal is, in each case, spaced midway between the principal side bands of the desired carrier and can be eliminated by comb filter 83 to yield the desired reconverted chrominance component C$_s$ which is free of any crosstalk chrominance component.

It will be apparent from the above that, in the described recording and/or reproducing apparatus according to this invention, the resultant video picture which is displayed in response to the reproduced color video signals obtained at output terminal 80 will be free of crosstalk interference even though the video signals have been recorded without guard bands between successive parallel tracks on tape T and even though such tracks have been provided with a very small width so as to attain a high recording density.

Figures 8, 10:
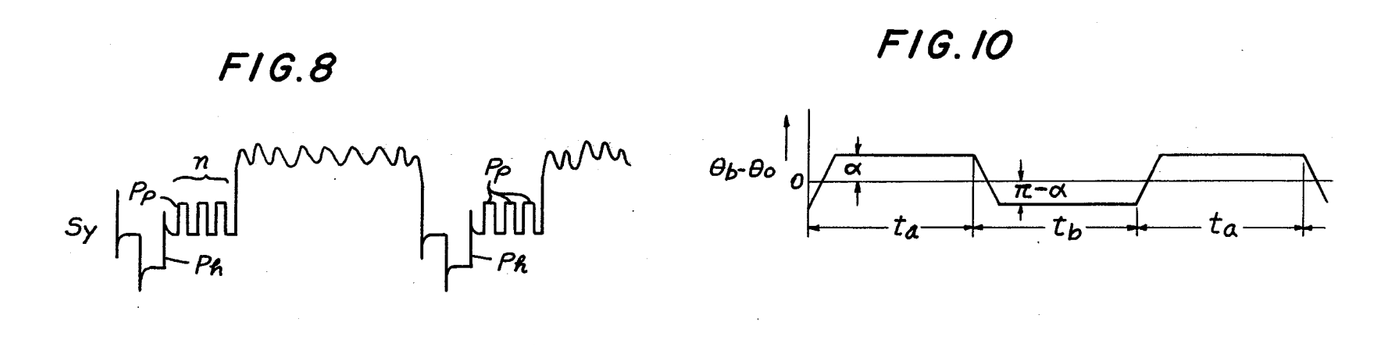
FIGS. 8 and 9 are waveform diagrams showing alternative embodiments for inserting a pulse signal into a video signal to determine the phase of the frequency modulated video signal.
FIGS. 10 and 11 are graphical depictions of the manner in which alternative embodiments of the present invention operate.

In the embodiment described with respect to FIGS. 4 and 7, it was assumed that the pulse signal P$_p$ selectively inserted into a line interval, such as onto the back porch of the horizontal synchronizing pulse, was formed of a single pulse whose amplitude was sufficient to produce a phase shift of $\theta$ ($=\pi$). However, in an alternative embodiment, pulse signal P$_p$ is formed of a plurality (for example, n) of pulses, each having an amplitude less than the amount necessary for causing a phase shift θ, as shown in FIG. 8. If the amplitude of each of these n pulses is $P_n$, then the sum of the pulse amplitudes ($nP_n$) is the amount necessary for causing a phase shift θ (such as θ = π). When the single pulse signal $P_p$ is replaced by n smaller pulses (as shown in FIG. 8), subtracting circuit 77 in the reproducing section can be omitted. This is because, in one type of video record/playback systemj a control pulse is added to the reproduced video signal for the purpose of an automatic gain control operation. If the single pulse $P_p$ is not removed from the recovered video signal, this pulse could falsely interfere with the automatic gain control operation. However, since the n pulses of FIG. 8 are of relatively low amplitude, this problem of interfering with the automatic gain control operation is not present; and subtracting circuit 77 can be omitted.

Figure 9:
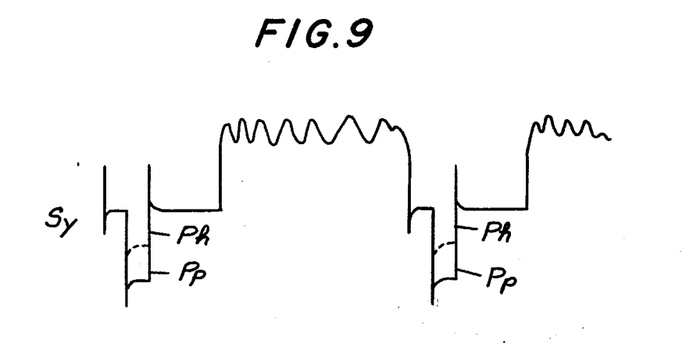

In another embodiment shown in FIG. 9, the pulse signal $P_p$ is superimposed onto the horizontal synchronizing pulse $P_h$. Also, the amplitude of the pulse signal $P_p$ is negative so as to impart a negative phase shift to the frequency modulated video signal. That is, the phase change Δθ in FIGS. 6C and 6D will be negative.

It may be recognized that, theoretically, the pulse signal $P_p$ can be inserted into any desired portion of a line interval, provided this inserted pulse signal is removed during a reproducing operation. However, it is preferred to insert the pulse signal into the horizontal synchronizing interval, as described above.

In yet another embodiment, the pulse signals need not be inserted only in successive line intervals of alternate tracks (or fields), and need not have an amplitude for causing a phase shift of π. For example, and as represented in FIG. 10, in one line interval the inserted pulse signal has an amplitude that causes a phase shift of α, and in the next successive line interval the inserted pulse signal has an amplitude that causes a phase shift of α−π. Hence, the phase shift between successive line intervals in a given track is α−(α−π)=π. Also, the frequency modulated video signal recorded in successive line intervals in the next adjacent track may have a constant phase α, thereby providing a phase shift of π between alternate line intervals in one track and alternate line intervals in the next adjacent track.

Figure 11:
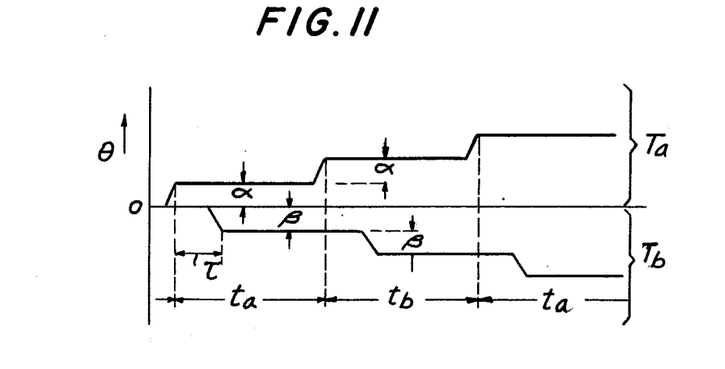

As a still further embodiment, the phase of the frequency modulated video signal may change by α from line-to-line in one track, and the phase of the frequency modulated video signal may change by −β from line-to-line in the next adjacent track, wherein α+β=π, as shown in FIG. 11.

In another embodiment, a pulse signal of amplitude for causing a phase shift of π is inserted into alternate line intervals (for example, line intervals $t_a$) in one track, and the same pulse signal is inserted into different alternate line intervals (for example, line lintervals $t_b$) in the next adjacent track.

The foregoing alternate embodiments can be implemented by providing, for example, two pulse forming circuits in place of pulse forming circuit 42, each adapted to generate a pulse signal of amplitude corresponding to a phase shift α and β, respectively. Also, switching circuit 43 may be provided with two input terminals and may be controlled as a function of pulses $S_h$ (FIG. 5H) or pulses $S_x$ (FIG. 5I).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope or spirit of the invention as defined in the appended claims. For example, the record medium need not be limited solely to a magnetic tape; but may comprise a magnetic sheet, a magnetic disc, a photo-optical medium, or the like, having successive adjacent tracks recorded thereon. Other changes and modifications have been suggested at various portions of the foregoing specification; and it is intended that the appended claims be interpreted as including such changes and modifications.

What is claimed is:

1. A method of recording a video signal component in successive parallel tracks on a record medium, said video signal component having signal information occurring in successive line intervals, which line intervals occur in successive field intervals, comprising the steps of frequency modulating a carrier with said video signal component to produce a frequency modulated video signal; selectively shifting the phase of said frequency modulated video signal in selected line intervals thereof by inserting a pulse signal of predetermined amplitude and duration into selected line intervals of said video signal component before the frequency modulation of said carrier therewith; and recording the selectively phase shifted frequency modulated video signal in said parallel tracks such that the phase difference between frequency modulated video signals in at least some adjacently recorded line intervals of successive tracks is an odd multiple of π.

2. The method of claim 1 wherein the step of inserting a pulse signal into selected line intervals comprises inserting a first pulse into alternate line intervals of a given field interval; and inserting a second pulse into alternate line intervals of the next adjacent field interval, whereby the relative phases are shifted by an odd multiple of π between alternate line intervals which are recorded adjacent to each other in successive tracks.

3. The method of claim 1 wherein the step of inserting a pulse signal into selected line intervals comprises inserting a first pulse into successive line intervals of one field interval having a first amplitude to cause a phase shift in said frequency modulated video signal of α and inserting a second pulse into successive line intervals of the next field interval having a second amplitude to cause a phase shift in said frequency modulated video signal of −β, wherein α+β=π.

4. The method of claim 1 wherein the step of inserting a pulse signal into selected line intervals comprises inserting said pulse into successive line intervals in alternate field intervals, whereby the relative phases are shifted by an odd multiple of π between successive line intervals which are recorded in the same track.

5. The method of claim 1 wherein the step of inserting a pulse signal into selected line intervals comprises inserting a first pulse into alternate line intervals of a first field interval having a first amplitude to cause a phase shift in said frequency modulated video signal of α; inserting a second pulse into the remaining line intervals of said field interval having a second amplitude to cause a phase shift in said frequency modulated video signal of α−π; and inserting said first pulse into successive line intervals of the next adjacent field interval.

6. The method of claim 1 wherein the step of inserting a pulse signal into selected line intervals comprises inserting said pulse signal onto the back porch of the horizontal blanking interval of selected line intervals.

7. The method of claim 1 wherein said pulse signal is constituted by a plurality of pulses which are inserted into a predetermined portion of each of said selected line intervals.

8. The method of claim 1 wherein said pulse signal is superimposed onto the horizontal synchronizing pulse of selected line intervals.

9. The method of claim 1 wherein said video signal component is the luminance component of a composite color television signal of the type including also a chrominance component; and further comprising the steps of separating said luminance and chrominance components from said composite color television signal; frequency converting said chrominance component to a frequency band below the frequency band of the frequency modulated luminance component; combining said frequency converted chrominance component with the selectively phase shifted frequency modulated luminance component; and recording the combined components in the same track on said record medium.

10. The method of claim 9 wherein said step of frequency converting the chrominance component comprises converting the carrier of said chrominance component to a first carrier for recording in one track; and converting the carrier of said chrominance component to a second carrier for recording in the next adjacent track.

11. A method of reproducing video signal information which has been recorded in successive tracks on a record medium, each track containing successive line intervals of recorded frequency modulated video signal components, and wherein the phase of the frequency modulated video signal component in one line interval differs from the phase of the frequency modulated video signal component in an adjacent line interval by an odd multiple of $\pi$, comprising the steps of scanning said successive tracks by a transducer to reproduce the frequency modulated video signal components recorded in the successive line intervals of each track together with a crosstalk component picked up from the adjacent track, the reproduced crosstalk components being out of phase with each other; frequency demodulating the reproduced frequency modulated video signal components to recover the video signal information and a selective pulse signal of predetermined amplitude and duration superimposed onto said video signal information for determining the relative phase shift of said frequency modulated video signal component in a respective line interval; and removing said selective pulse signal from the recovered information in said respective line interval.

12. The method of claim 11 wherein said pulse signal is superimposed onto video signal information in successive line intervals in alternate tracks.

13. The method of claim 11 wherein said pulse signal comprises a first pulse superimposed onto video signal information in alternate line intervals in one track and a second pulse superimposed onto video signal information in alternate line intervals in the next adjacent track, and alternate line intervals in both tracks being adjacent each other.

14. The method of claim 13 wherein said first pulse is of a first amplitude to cause a phase shift in said frequency modulated video signal of $\alpha$ and said second pulse is of a second amplitude to cause a phase shift in said frequency modulated video signal of $-\beta$, wherein $\alpha + \beta = \pi$.

15. The method of claim 11 wherein said pulse signal comprises a first pulse superimposed onto video signal information in alternate line intervals in a first track, said first pulse having an amplitude to cause a phase shift in said frequency modulated video signal of $\alpha$; a second pulse superimposed onto video signal information in the remaining line intervals in said first track, said second pulse having an amplitude to cause a phase shift in said frequency modulated video signal of $\alpha - \pi$; and said first pulse superimposed onto video signal information in successive line intervals in said next adjacent track.

16. The method of claim 11 wherein said pulse signal comprises a first pulse superimposed onto video signal information in successive line intervals in a first track, said first pulse having an amplitude to cause a phase shift in said frequency modulated video signal of $\alpha$; and a second pulse superimposed onto video signal information in successive line intervals in the next adjacent track, said second pulse having an amplitude to cause a phase shift in said frequency modulated video signal of $-\beta$, wherein $\alpha + \beta = \pi$.

17. The method of claim 11 wherein said pulse signal is added to selected horizontal synchronizing intervals of said video signal component prior to frequency modulating said video signal component during a recording operation to determine the phase of said frequency modulated video signal component, and said step of removing said pulse signal from the recovered information comprises selectively generating a local pulse signal substantially equal to said recovered pulse signal; and subtracting said local pulse signal from said recovered information.

18. The method of claim 17 wherein the added pulse signal is constituted by a plurality of successive pulses.

19. The method of claim 17 wherein the added pulse signal is superimposed onto the horizontal synchronizing pulse of said video signal information.

20. The method of claim 11 wherein said video signal component is the luminance component of a composite color television signal having a chrominance component which also is recorded in said successive tracks, said chrominance component in each line interval having been frequency converted to a lower frequency band than the frequency modulated luminance component in said line interval, and further comprising separating the frequency modulated luminance component from the frequency converted chrominance component in the composite color television signal reproduced by said transducer; and frequency reconverting the chrominance component back to an original carrier frequency.

21. The method of claim 20 in which the frequency of the recorded chrominance component and the original carrier frequency of the chrominance component are in frequency interleaving relation to each other.

22. The method of claim 21 wherein the chrominance component is recorded in one track with a first carrier and in a second adjacent track with a second carrier, the first and second tracks alternating across the record medium, and wherein a crosstalk component of the chrominance component recorded in an adjacent track is picked up when a given track is scanned; and wherein the step of frequency reconverting the chrominance component comprises reconverting the chrominance components reproduced from said first track with a first local carrier; reconverting the chrominance components reproduced from said second track with a second local carrier; and eliminating the reconverted crosstalk components for each scanned track.

23. Apparatus for recording an information signal component in successive parallel tracks on a record medium, said information signal component occurring in successive first time intervals which are included in repetitive second time intervals, said second time intervals being longer than said first time intervals, said apparatus comprising frequency modulating means for frequency modulating a carrier with said information signal component to produce a frequency modulated information signal; phase shifting means for selectively shifting the phase of said frequency modulated information signal occurring in selected ones of said first time intervals, comprising pulse generating means for generating pulse signals of predetermined amplitude and duration during selected ones of said first time intervals, and means for inserting said pulse signals into selected ones of said first time interval of said information signal component in advance of said frequency modulating means; and recording means coupled to said frequency modulating means for recording the frequency modulated information signals in respective areas in said parallel tracks, each said area corresponding to one of said first time intervals, such that the phase of said frequency modulated information signals recorded in a predetermined area differs from the phase of said frequency modulated information signals recorded in an adjacent area by an odd multiple of $\pi$.

24. The apparatus of claim 23 wherein said phase shifting means further includes control means for controlling the insertion of said pulse signals into said first time intervals such that a first pulse is inserted into alternat first time intervals during a second time interval and a second pulse is inserted into alternate first time intervals during the next second time interval, whereby the phase shift between the frequency modulated information signals recorded in alternate areas in one track and the frequency modulated information signals recorded in alternate areas in the adjacent track is equal to an odd multiple of $\pi$.

25. The apparatus of claim 24 wherein said pulse generating means produces first and second periodic pulses of equal amplitudes.

26. The apparatus of claim 23 wherein said pulse generating means produces a first pulse of amplitude to cause a phase shift in said frequency modulated information signal of $\alpha$ and a second pulse of amplitude to cause a phase shift in said frequency modulated information signal of $-\beta$, wherein $\alpha + \beta = \pi$; and further comprising control means for controlling the insertion of said first pulse into successive first time intervals during a second time interval and the insertion of said second pulse into successive first time intervals during the next second time interval.

27. The apparatus of claim 23 further comprising control means for controlling the insertion of said pulse signals into successive first time intervals of alternate second time intervals, whereby the phase shift between the frequency modulated information signals recorded in successive areas in alternate tracks is equal to an odd multiple of $\pi$.

28. The apparatus of claim 23 wherein said pulse generating means produces a first pulse of amplitude to cause a phase shift in said frequency modulated information signal of $\alpha$ and a second pulse of amplitude to cause a phase shift in said frequency modulated information signal of $\alpha - \pi$; and further comprising control means for controlling the insertion of said first pulse into alternate first time intervals and the insertion of said second pulse into the remaining first time intervals during a second time interval, and the insertion of said first pulse into successive line intervals of the next second time interval, whereby the phase shift between the frequency modulated information signals recorded in alternate areas in adjacent tracks is equal to an odd multiple of $\pi$.

29. The apparatus of claim 23 wherein said information signal component is a video signal having horizontal synchronizing pulses defining line intervals; and said pulse generating means comprises synchronizing pulse separating means for separating said horizontal synchronizing pulses from said video signal, and pulse shaping means for shaping said separated horizontal synchronizing pulses into predetermined wave shape.

30. The apparatus of claim 29 wherein said means for inserting comprises adding means having one input for receiving said video signal and another input for receiving said pulses of predetermined wave shape; and switch means coupled to said other input for selectively applying said pulses thereto.

31. The apparatus of claim 30 wherein said pulses of predetermined wave shape each comprises a plurality of pulses timed to coincide with the back porch of said horizontal synchronizing pulse.

32. The apparatus of claim 30 wherein said pulses of predetermined wave shape each comprises a single pulse timed to coincide with said horizontal synchronizing pulse.

33. The apparatus of claim 23 wherein said information signal component is the luminance component of a composite color television signal of the type including a chrominance component and horizontal and vertical synchronizing signals, and wherein said first time intervals are line intervals and said second time intervals are field intervals; said apparatus further comprising separating means for separating said luminance and chrominance components and for supplying said luminance component to said frequency modulating means; frequency converting means for frequency converting said chrominance component to a frequency band below the frequency band of the frequency modulated luminance component; combining means for combining the frequency converted chrominance component and the selectively phase shifted frequency modulated luminance component; and means for supplying the combined components to said recording means for recording in the same tracks.

34. The apparatus of claim 33 wherein said frequency converting means comprises means for providing different first and second carriers for said chrominance component, carrier selector means for alternatively selecting the first and second carriers for said chrominance component to be recorded in said tracks, and selector control means operative to cause the recording of said chrominance component with the first and second carriers therefor, respectively, in tracks which are next adjacent each other.

35. Apparatus for recording a video signal component in successive parallel tracks on a record medium and for reproducing said video signal component therefrom, said video signal component having signal information occurring in successive line intervals included in field intervals, said apparatus including a recording section comprised of frequency modulating means for frequency modulating a carrier with said video signal component to produce a frequency modulated video signal, phase shifting means for selectively shifting the phase of said frequency modulated video signal occurring in selected ones of said line intervals comprising pulse generating means for generating pulse signals of predetermined amplitude and duration during selected ones of said line intervals and means for inserting said pulse signals into selected ones of said line intervals in advance of said frequency modulating means; and recording means for receiving the frequency modulated video signal, after selective phase shifting, for recording the received frequency modulated video signal in respective areas in said parallel tracks, each said area corresponding to a line interval, such that the phase of said frequency modulated video signal recorded in a predetermined area differs from the phase of said frequency modulated video signal recorded in an adjacent area by an odd multiple of $\pi$; and a reproducing section comprised of reproducing means for reproducing the frequency modulated video signal recorded in said respective areas in said parallel tracks together with crosstalk signals picked up from respective adjacent tracks; frequency demodulating means for frequency demodulating the reproduced frequency modulated video signal to recover the video signal component together with said inserted pulse signal; and means for removing said pulse signal from the recovered video signal component.

36. The apparatus of claim 35 wherein said phase shifting means further includes control means for controlling the insertion of said pulse signals into alternate line intervals in each of successive field intervals, such that the phase shift between the frequency modulated video signals recorded in alternate areas in one track and the frequency modulated video signals recorded in alternate areas in the adjacent track in equal to an odd multiple of $\pi$.

37. The apparatus of claim 35 wherein said phase shifting means further includes control means for controlling the insertion of said pulse signals into successive line intervals of alternate field intervals, such that the phase shift between the frequency modulated video signals recorded in successive areas in each of alternate given tracks is equal to an odd multiple of $\pi$.

38. The apparatus of claim 35 wherein said pulse generating means produces a first pulse of amplitude to cause a phase shift in said frequency modulated video signal of $\alpha$ and a second pulse of amplitude to cause a phase shift in said frequency modulated video signal of $-\beta$, wherein $\alpha+\beta=\pi$; and further comprising control means for controlling the insertion of said first pulse into successive line intervals during one field interval and the insertion of said second pulse into successive line intervals during the next field interval.

39. The apparatus of claim 35 wherein said pulse generating means comprises synchronizing pulse separating means for separating horizontal synchronizing pulses from said video signal component, and means for generating said pulse signals of predetermined amplitude and duration in response to said separated horizontal synchronizing pulses.

40. The apparatus of claim 35 wherein said means for inserting comprises adding means having one input for receiving said video signal and another input for receiving said pulses of predetermined wave shape; and switch means coupled to said other input for selectively applying said pulses thereto.

41. The apparatus of claim 40 wherein said pulses of predetermined wave shape each comprises a plurality of pulses timed to coincide with the back porch of said horizontal synchronizing pulse.

42. The apparatus of claim 40 wherein said pulses of predetermined wave shape each comprises a single pulse timed to coincide with said horizontal synchronizing pulse.

43. The apparatus of claim 40 wherein said pulse generating means is operative during both a recording and a reproducing operation; and said means for removing said pulse signal from the recovered video signal component in said reproducing section comprises subtracting means having one input for receiving said recovered video signal component and another input coupled to said switch means for subtracting said pulse signals from said recovered video signal component.

44. The apparatus of claim 43 wherein said phase shift means further comprises means responsive to said recovered video signal component for producing a switching signal synchronized with said field intervals, said switching signal having successive first and second portions, each of a duration substantially equal to a field interval; and means for applying said switching signal to said switch means to selectively operate same to apply said pulse signals to said subtracting means.

45. Apparatus for reproducing an information signal component which has been recorded as a frequency modulated signal in successive tracks on a record medium, said information signal component occurring in successive first time intervals which are recorded in correspondingly successive record areas in each track, the phase of the frequency modulated signal in one record area differing from the phase of the frequency modulated signal in an adjacent record area by an odd multiple of $\pi$, the apparatus comprising transducer means for scanning said successive tracks to reproduce therefrom the frequency modulated signal recorded in the successive record areas of each track together with a crosstalk component picked up by said transducer means from an adjacent track, the crosstalk components being out of phase with each other; demodulating means for frequency demodulating the reproduced frequency modulated signals to recover the information signal component and a selective pulse signal of predetermined amplitude and duration superimposed onto said information signal component for determining the relative phase shift of said frequency modulated signal in a respective first time interval; and means for eliminating said pulse signal from said recovered information signal component in said respective line interval.

46. The apparatus of claim 45 wherein the pulse signal is superimposed onto said information signal component in alternate record areas in successive tracks, whereby the phase of the frequency modulated signals in alternate record areas in adjacent tracks differ from each other by an odd multiple of $\pi$.

47. The apparatus of claim 45 wherein the pulse signal is superimposed onto said information signal component in successive record areas in alternate tracks, whereby the phase of the frequency modulated signals in successive record areas in alternate tracks differ from each other by an odd multiple of $\pi$.

48. The apparatus of claim 45 wherein the pulse signal is formed of a first pulse having an amplitude to cause a phase shift in said frequency modulated signals of a $\alpha$ and superimposed onto said information signal component in successive record areas in one track, and a second pulse having an amplitude to cause a phase shift in said frequency modulated signals of $-\beta$ and superimposed onto said information signal component in successive record areas in the next adjacent track.

49. The apparatus of claim 45 wherein said means for eliminating said pulse signal comprises means for generating pulse signals synchronized with the scanning of each record area; subtracting means for receiving said recovered information signal component; and means for selectively applying said generated pulse signals to said subtracting means for cancelling said recovered pulse signal from said recovered information signal component.

50. The apparatus of claim 49 wherein said means for eliminating said pulse signal further comprises means for sensing when said transducer means begins to scan a track on said record medium and for generating an alternating signal in response to the scanning of successive tracks; and means for applying said generated pulse signals to said subtracting means for selected portions of said alternating signal.

51. The apparatus of claim 45 wherein said information signal component is the luminance signal of a composite color television signal having a chrominance signal and synchronizing signals, all of which are recorded in said successive tracks, each record area having a line interval recorded therein and each track having a field interval recorded therein, the chrominance signal in each line interval having been frequency converted from an original carrier frequency to a lower frequency band than the frequency modulated luminance signal; said apparatus further compr—sing separating means for separating the frequency modulated luminance signal from the frequency converted chrominance signal in the composite color television signal reproduced by said transducer; and frequency reconverting means for frequency reconverting the chrominance signal back to its original carrier frequency.

52. The apparatus of claim 51 wherein the converted, lower carrier frequency $f_c$ is equal to $f_c = (2m-1)f_H/4$, in which $f_H$ is the frequency of said synchronizing signals and m is a positive integer.

53. The apparatus of claim 51 in which the frequency converted chrominance signal is recorded in adjacent tracks with different first and second carriers, respectively, and wherein said frequency reconverting means reconverts the carriers of the chrominance signals reproduced from said tracks to a common carrier; and further comprising a comb filter for eliminating crosstalk signals in said chrominance signals picked up from adjacent tracks.

* * * * *